July 28, 1964  YASUHIRO ISHIDA  3,142,140
PROCESS OF MANUFACTURING A PRECISE NON-SPHERICAL SURFACE
Filed April 18, 1961  2 Sheets-Sheet 1

INVENTOR.

United States Patent Office 3,142,140
Patented July 28, 1964

3,142,140
PROCESS OF MANUFACTURING A PRECISE
NON-SPHERICAL SURFACE
Yasuhiro Ishida, Kashiwa, Chiba Prefecture, Japan, assignor to The Agency of Industrial Science and Technology, Tokyo, Japan, a corporation of Japan
Filed Apr. 18, 1961, Ser. No. 103,928
Claims priority, application Japan Dec. 14, 1960
1 Claim. (Cl. 51—284)

The present invention relates to a process of manufacturing a precise non-spherical surface.

Generally, it has been difficult to manufacture a precise non-spherical surface suitable for a desired purpose. A process of making a desired non-spherical surface of the upper surface of a lens cast in a mould by heating the lens which is polished to the form of a spherical surface is known. A process of making a non-spherical surface from a spherical surface by utilizing the change in the form by heating, suspending it freely by providing direct contact with the mould and controlling its temperature and time is likewise known. A process of making a non-spherical surface by the recovery of elasticity by riding a parallel planed glass on a drum of metal and distorting it by vacuum, so as to effect the polishing of a spherical surface is known. A process of making a non-spherical surface by predetermining the shape of a cam and a length and position of a link providing every condition of a desired non-spherical surface by using a cam-like mechanism, a process of changing the area of which the lap is impacted, and a process of correcting from a spherical surface by a vacuum evaporated film and the like are likewise known. However, any of these manufacturing processes involve necessary labor and expense and it is not only difficult to make precisely a desired non-spherical surface, but also a quantity production of precise non-spherical surfaces is very difficult.

It is one object of the present invention to provide a process according to which a spherical surface can be effected by quantity production of a precise desired non-spherical surface economically and simply without necessity of any expense by adjusting an eccentricity and inclination in a three-dimensional manner between a work axis of a curve generator and an axis of a tool.

With this and other objects in view, which will become apparent in the following detailed description, the present invention will be clearly understood in connection with the accompanying drawings, in which.

Figure 1:
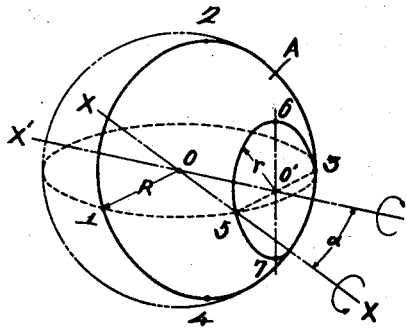
FIGURE 1 is a front elevation of a diagrammatic showing of the principle of the present invention starting with a spherical surface.
Figure 2:
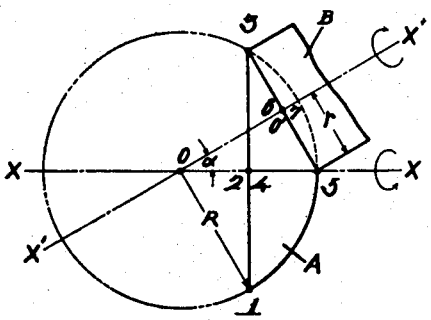
FIG. 2 is a plan view thereof.

Referring now to the drawings, and in particular to FIGS. 1 and 2, the principle of originating a spherical surface is disclosed. FIG. 1 is an elevational view and FIG. 2 is a plan view including a work axis X and a tool axis X'. In this case, parts are arranged as shown in FIG. 1, and the circumference of a tool B is given by the numerals 5, 6, 3 and 7, which is, for instance, a tip end of a grinding wheel, if the radius of the curvature of the body A to be worked is R, the radius of the movement of the tool B is $r$, and the intersecting angle between both axes X and X' is $\alpha$, the following relation is established.

$$\sin \alpha = \frac{r}{R} \text{ or } R = \frac{r}{\sin \alpha} \quad (1)$$

Figure 3:
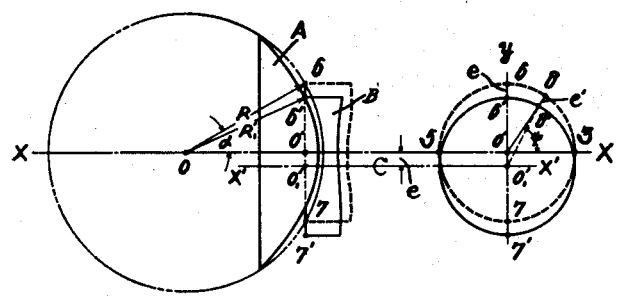
FIGS. 3 and 4 are schematic views explaining the principle of the present invention, FIG. 3 indicating the difference of the height between the axes and FIG. 4 indicating the inclination of the axes.

By rotating both axes X, X', as shown by an arrow, a true spherical surface A, indicated by 1, 2, 3 and 4 having a radius R of the curvature is obtained. Thereupon, when a difference $e$ in height of the axes X and X' about the vertical plane 6, $0_1'$, 7 is provided, including the axis X', as shown in FIG. 3, the positions of the tip end of the tool are as indicated by 6', 0', 7'. The radius R' of the curvature is given by the following formula:

$$R_1' \doteq R - e \sin \alpha \sin \psi \quad (2)$$

In the above formula, $\psi$ is the angle between the axis $x$ in the plane of the tool, and this angle is assumed from the reverse side of the apex 5, and it has a value within the range of $\psi = 0 \sim 2\pi$. Accordingly, the height of 6 to 6', when $\psi = 90°$, is $e$, and if $\psi = 0$, That is, the length from 8 to 8' is $e'$ and when 8 8'$=e'$, $e'=e \sin \psi$.

Also, in the Formula 2, if the difference from the radius $r$ of the curvature R of a true sphere is $\Delta R_1$, $$\Delta R_1 \equiv R_1' - R = -e \sin \alpha \sin \psi \quad (3)$$

is obtained. In this case, the maximum value and the minimum value are as follows:

$$\Delta R_1 \text{ max.} = -e \cdot \sin \alpha \quad (4)$$

$$\left(\text{in } \psi = \frac{\pi}{2}\right)$$

$$\Delta R_1 \text{ min.} = 0 \quad (5)$$

$$(\text{in } \psi = 0 \cdot \pi)$$

Figure 4:
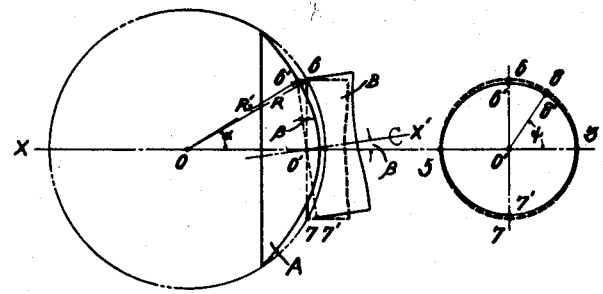

Next, in the case of an inclination $\beta$ between the axes X and X' as shown in FIG. 4, the radius of curvature is $$R_2' \doteq R - r \cdot \beta \cos \alpha \sin \psi$$

or $$R_2' \doteq \left(1 - \frac{\beta}{2} \sin 2\alpha \sin \psi\right) R \quad (6)$$

The deviation from the true sphere is:

$$\Delta R_2 = -r \cdot \beta \cos \alpha \sin \psi$$

or $$\Delta R_2 = -\frac{R}{2} \beta \sin 2\alpha \sin \psi \quad (7)$$

$\psi$ is entered owing to the difference of $\beta$ ($\beta'=\beta \sin \psi$) at any place taking by $\beta$ and is held within a range of a value from 0 to $2\pi$. In this case, the maximum value and minimum value are as follows:

$$\Delta R_2 \text{ max} = -\frac{R}{2} \beta \sin 2\alpha \quad (8)$$

$$\left(\text{in } \psi = \frac{\pi}{2}\right)$$

$$\Delta R_2 \text{ min.} = 0 \quad (\text{in } \psi = 0 \cdot \pi) \quad (9)$$

In the process of originating a spherical surface limited to the prior two-dimensional adjustment, when for the difference of the height $e$ or of an inclination $\beta$ of both axes X and X' three-dimensional adjustment is provided, it can be changed from the true sphere as shown by the Formula 2 or 6 to a non-spherical surface given by the changed amount in the form of a sine like form represented by the Formula 3 or 7.

Even in the combination of the above matters, almost the same result can be obtained, that is, in this case, a radius of curvature $R_3'$ and a difference $\Delta R_3$ from the true sphere are obtained as follows:

$$R_3' \doteq R + \Delta R_1 + \Delta R_2 \quad (10)$$

$$\Delta R_3 = \Delta R_1 + R_2 \quad (11)$$

The above-mentioned relation can also be brought about in the same way in case the tip end of the tool is round, because a line contact is achieved. Furthermore, in FIGS. 3 and 4, it is shown that in case a concave surface is created, if in the drawing the tool is inserted in such manner that it performs the same operation as placed on the opposite side and the tool is treated, then a concave surface which is given a sine transformation, will be obtained.

Next, a practicing example of the present invention will now be described.

Even if the original surface is a spherical surface, a complex spherical surface having two or more radii of curvature can be formed. However, in such case, when the above process is applied to the formation of a non-spherical surface, a non-spherical surface can be widely manufactured.

Figure 5A:
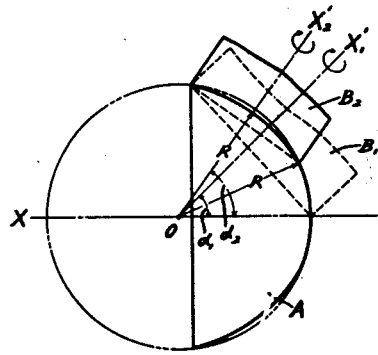
FIGS. 5A and 5B are views showing examples in ble of performing the process of the present invention.
Figure 5B:
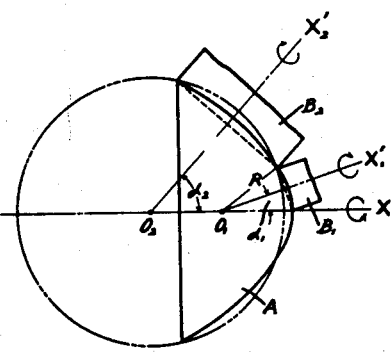

For example, in FIG. 5A, a first arrangement wherein a grinding wheel $B_1$ is mounted at an intersecting angle $\alpha_1$ so as to form a true sphere having a radius R of the curvature, and a second arrangement wherein a grinding wheel $B_2$ is mounted at an intersecting angle $\alpha_2$ so as to form a non-spherical surface having a radius of curvature $R'(=R_1', R_2',$ or $R_3')$ according to this invention are provided, and then by combining the said first and second arrangements, its complex result can be originated as a combined non-spherical surface as shown in a solid line in FIG. 5A. Also, as shown in FIG. 5B, a third arrangement in which the grinding wheel $B_1$ is mounted at the intersecting angle $\alpha_1$, so as to form a true sphere having a radius of curvature R, and a fourth arrangement wherein the grinding wheel $B_2$ is mounted at the intersecting angle $\alpha_2$ so as to form a non-spherical surface having the radius of curvature $R'(=R_1', R_2$ or $R_3')$ according to this invention are provided, and then by combining the said third and fourth arrangements, its complex result can be originated as a combined non-spherical surface as shown in a solid line in FIG. 5B, and consequently, the application of this invention is made considerably large.

When the process as above described is used, in comparison with the prior complex process, the present process has the characteristic that it can easily be applied for a quantity production of a particular non-spherical surface having any radius of curvature R' represented by the Formula 2 or the Formula 6, and the Formula 10, by working suitably by adjusting $r$, $\alpha$, $\beta$ and $e$, which can be changed individually according to a desired spherical surface, that is, a diameter $2r$ of a circle traced by the tool, an inclination angle $\alpha$ and $\beta$ between the axis of the work to be worked and the axis of the tool, or an eccentricity $e$ of these axes and the like.

Figure 6:
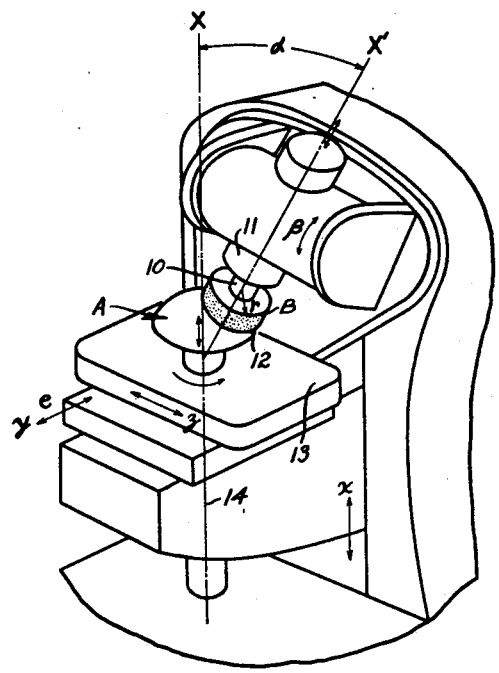
FIG. 6 is a side perspective view of an apparatus capable of performing the process of the present invention.

As an example, if a mechanism having a work A and a work table adjustable and feedable in the directions $x, y, z$ including a work axis 14, and a tool B, tool spindle 10 and a tool head 11, 12 turnable on the bed 13 in the plane of z are used, as shown in FIG. 6, even all or part of these three-dimensional movements are entirely the same to each other. Thus the construction may be comparatively simple.

While I have disclosed one embodiment of the present invention, it is to be understood that this embodiment is given by example only and not in a limiting sense, the scope of the present invention being determined by the objects and the claim.

I claim:

A process of grinding a precise non-spherical surface of a lens blank mounted on a rotating spindle, said lens blank to be ground by a rotating tool, comprising the steps of mounting a lens blank on a rotating spindle, rotating said lens blank about a first axis independently from the rotation of a tool grinding said lens blank, adjusting said lens blank in three dimensions perpendicular to each other relative to said tool, tilting the axis of said tool in any direction about a point and adjusting said tool along said tool axis in order to obtain the required eccentricity between the rotating axis of said tool and that of said lens blank, and grinding the surface of said lens blank upon engagement with said rotating tool.

References Cited in the file of this patent
UNITED STATES PATENTS

| | | |
|---|---|---|
| 1,448,239 | Schussler | Mar. 13, 1923 |
| 1,659,277 | Maynard | Feb. 14, 1928 |
| 2,392,478 | Holman | Jan. 8, 1946 |
| 2,419,543 | Ellis et al. | Apr. 29, 1947 |
| 2,634,557 | Seidner | Apr. 14, 1953 |
| 2,806,327 | Coburn | Sept. 17, 1957 |
| 2,836,939 | White | June 3, 1958 |
| 2,975,565 | Phillips | Mar. 21, 1961 |